United States Patent
Pringle et al.

(10) Patent No.: US 7,082,172 B1
(45) Date of Patent: Jul. 25, 2006

(54) DIGITAL SIGNAL GATING APPARATUS AND METHOD IN A PULSE RECEIVER SYSTEM

(75) Inventors: Richard Charles Pringle, Van Nuys, CA (US); Joanna S. Quan, West Hills, CA (US)

(73) Assignee: Alliant Techsystems Inc., Edina, MN (US)

( * ) Notice: Subject to any disclaimer, the term of this patent is extended or adjusted under 35 U.S.C. 154(b) by 792 days.

(21) Appl. No.: 10/268,170

(22) Filed: Oct. 9, 2002

Related U.S. Application Data

(60) Provisional application No. 60/354,548, filed on Feb. 5, 2002.

(51) Int. Cl.
*H03K 9/00* (2006.01)

(52) U.S. Cl. ............... 375/316; 375/371; 375/332; 375/340; 375/341; 375/354; 375/346; 375/326; 342/80; 342/13; 386/2; 348/506; 356/323; 327/280

(58) Field of Classification Search .......... 375/316, 375/371, 332, 340, 341, 354, 346, 326; 342/80, 342/13; 386/2; 348/506; 356/323; 327/280
See application file for complete search history.

(56) References Cited

U.S. PATENT DOCUMENTS

| | | | | |
|---|---|---|---|---|
| 3,967,900 | A | * | 7/1976 | Henninger et al. ......... 356/323 |
| 4,024,571 | A | * | 5/1977 | Dischert et al. ............... 386/2 |
| 4,620,219 | A | * | 10/1986 | Burrowes .................... 348/506 |
| 4,768,034 | A | * | 8/1988 | Preikschat et al. ............ 342/80 |
| 4,866,314 | A | | 9/1989 | Traa |
| 5,054,038 | A | * | 10/1991 | Hedberg ...................... 375/371 |
| 5,063,385 | A | * | 11/1991 | Caschera ..................... 342/13 |
| 5,686,850 | A | | 11/1997 | Takaki |
| 6,154,497 | A | | 11/2000 | Gatherer |
| 6,288,588 | B1 | * | 9/2001 | Frisch ........................ 327/280 |

* cited by examiner

*Primary Examiner*—Emmanuel Bayard
*Assistant Examiner*—Sudhanshu C. Pathak
(74) *Attorney, Agent, or Firm*—Michael Blaine Brooks, P.C.; Andrew S. Naglestad; Bruce Anderson

(57) ABSTRACT

A digital signal gating method and apparatus of a preprocessor in a detection system wherein the detection system includes a central processing unit, a main memory and a receiver, whereby the apparatus and method bifurcate received digital signals, delays them along a first path while subjecting the digital signals along a second path to detection, delay, and thresholding and thereby generates a gating signal from the second path so that digital signals of the first path, including pre-threshold amplitudes, may be recorded.

13 Claims, 4 Drawing Sheets

DIGITAL SIGNAL GATING APPARATUS AND METHOD IN A PULSE RECEIVER SYSTEM

CROSS REFERENCE TO RELATED APPLICATIONS

This application claims priority from the following U.S. provisional Patent Application, the disclosure of which, including all appendices and all attached documents, is incorporated by reference in its entirety for all purposes: U.S. Provisional Patent Application Ser. No. 60/354,548, Richard Charles Pringle and Joanna S. Quan entitled, "DIGITAL SIGNAL GATING AND PULSE SORTING APPARATUS AND METHOD IN A PULSE RECEIVER SYSTEM," filed Feb. 5, 2002. The present application also contains subject matter related to the subject matter disclosed in the following commonly-owned copending application that is being filed concurrently, and is hereby incorporated by reference in its entirety for all purposes: U.S. patent application Ser. No. 10/270,864, Richard Charles Pringle and Joanna S. Quan entitled, "PULSE SORTING APPARATUS FOR FREQUENCY HISTOGRAMMNG IN A RADAR RECEIVER SYSTEM."

FEDERALLY SPONSORED RESEARCH

The invention was made with Government support under N00019-94-C-0078 awarded by the Department of the Navy. The Government has certain rights in the invention.

FIELD OF THE INVENTION

The present invention relates generally to data sorting and more particularly to real-time signal gating as it pertains to the deinterleaving of pulse trains and the preservation of the leading edges of prequalified pulses.

BACKGROUND OF THE INVENTION

A modern radar tracking system is typically comprised of a receiver system and a digital processing system. The receiver system is typically comprised of an antenna, or antenna elements themselves comprising an antenna array, a multi-channel receiver, signal down-conversion, and some analog processing. The digital processing system is typically comprised of high-speed hardware processing and software-based processing.

Data sorting and pulse sorting in particular can be integral to the real-time tracking of radar emitters. Simple pulse-sorters can rely on preselected delay intervals, often the pulse repetition interval (PRI) minus one-half of the peak-to-peak jitter, and acceptance duration testing on pulse length. Tracking pulse sorters would have the delay interval and acceptance duration vary based on the actual accepted pulse intervals. The sorter would be reset after allowing for a predetermined number of missing pulses.

In addition, the duration, frequency characteristics, and amplitude of the current pulse could be compared to a reference or to the previously accepted pulse or an ensemble of previously accepted pulses. Failure to pass these tests can mean that the sorter was no longer locked on to the pulse train. The decision to accept or reject the pulse is typically made after the pulse appears so that one unacceptable pulse may appear at the output before the sorter reacts.

To prevent locking on to a similar signal that occurs during the time between scans, a lockout interval based on the scanning properties of the signal could be included if amplitude measurements were made. Because pulse amplitude (PA) is a strong function of distance to the emitter, it can often easily deinterleave signals that would otherwise be quite confusing. Pulse duration, or pulsewidth (PW), is often used along with amplitude. Pulse duration is less effective as a deinterleaving parameter because many radars are similar in this respect and the measured pulse duration of a particular emitter inherently varies with the amplitude. In addition, multipath causes variation in measured pulse duration values. Angle-of-arrival (AOA) can be measured on a single-pulse basis and is often used in combination with deinterleaving processes. In addition, carrier, or radio, frequency (RF), is a very powerful and commonly used sorting parameter.

Accordingly, in order to sort, associate or reject each signal from the myriad of signals, a sensitive radar tracking system may intercept each instantaneous signal intercepted by the receiver system, which is typically characterized by a set of parameters prior to storage and processing. This characterization provides the information required to associate a set of signals belonging to a particular emitter and to identify that emitter from among other emitters whose signals have been intercepted. The parameters generally measured by the receiver system for a pulsed signal include RF, PA, PW, time-of-arrival (TOA), and AOA. Also, in some systems, polarization of the input signal is measured. Frequency modulation on-the-pulse (FMOP) is another parameter that can be used to identify a particular emitter and also can be used to determine chirp rate of phase coding of a signal using pulse compression. TOA measures are made with respect to an internal clock at the leading edge, and in some cases the trailing edge, of the pulse. AOA measures can be enhanced or replaced by AOA determination processes typically calculated in the software digital processing.

With interferometric devices, it is typical that the amplitude and phase difference for each channel, receiver temperature and instantaneous frequency of every digital sampling point of a valid pulse designated by a unique pulse number be recorded. The parameters measured on a single intercepted pulse are typically stored in a data vector called a pulse descriptor word (PDW) or a "data group." Multiple PDWs form a set of vectors in parameter space. By matching vectors from multiple pulses, it is possible to isolate those signals associated with a particular emitter.

Deinterleaving can be accomplished through the pulse-by-pulse processing techniques relying on the matching of a number of pulse characteristics (e.g., RF, AOA and TOA) and can benefit greatly from histogram pre-processing approaches. Thereafter, pulse repetition intervals (PRI) can be computed for enhanced emitter characterization.

There remains a need for purposeful pulse delays in a digital signal gating apparatus that can retain leading edges of pulses that would otherwise be rejected due to noise thresholding. U.S. Pat. No. 4,866,314 to Traa discloses a transistor network to be used to delay a digital input signal. U.S. Pat. No. 6,154,497 to Gatherer, et al., discloses a method and system using an oversampled analog-to-digital converter (ADC) together with time adjustments and filters that purport to produce digital signals with lower error than more complex prior approaches. U.S. Pat. No. 5,686,850 to Takaki, et al., discloses a plurality of delay signals from which a particular delayed signal is selected based on phase detection, and through exploitation of a disclosed relationship, a second delayed signal is determined.

Fundamental to advanced forms of deinterleaving is the exploitation of the information contained in the leading edges of accepted pulses. The several embodiments of the present invention have several features, one of which is the ability to record this information in real-time while concurrently testing the acceptability of each of a continual stream of pulses.

SUMMARY

The digital signal gating apparatus embodiments of the present invention reside within the preprocessor of an RF pulse detection system After detecting an RF pulse, the digital signal gating apparatus selectively records RF pulse data from the received signals by generating a gating signal in the form of a data acquisition window that causes the complete record of the RF pulse to be extracted from a delayed version of the received signals. The present invention accomplishes this by using the gating signal to enable recording means to read into memory the digital signals after they have been delayed a predetermined amount of time. The several embodiments of the present invention permit the data corresponding to the entire RF pulse to be retained, avoiding the inadvertent loss of data preceding the point in time when the signal satisfies predetermined threshold and durational requirements.

The present invention provides a purposeful delay produced by a shift register that, in combination with a programmable durational requirement, allows for the use of a relatively high noise rejection threshold for pulse detection while retaining the entire sub-threshold portion of the leading edge of a pulse so that if the pulse qualifies as a valid pulse, based on duration above threshold for example, a more accurate determination of the TOA of the qualified pulse can be made.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE INVENTION

An apparatus embodiment of the present invention receives digital signals generated by a receiver. The generated receiver digital signals including measures of the RF pulse amplitude, phase difference and instantaneous frequency collectively referred to as RF data. The received digital signals are bifurcated along two separate paths in the digital signal gating apparatus. Along the first path, each of the receiver output signals is conveyed to a first delaying means such as a shift register which continually and systematically delays the digital signals before reproducing the same signals at its output a fixed time later. The propagation time through first delaying means is represent by M system clock cycles. The output of the first delaying means, i.e., the delayed digital signals, are applied to memory means where the delayed digital signals are selectively stored in the manner described below.

Along the second path, the digital signals from the receiver, typically the one or more amplitude measures, are conveyed to the signal detecting means which performs the quantitative analysis necessary to qualify, that is identify, a received RF signal. Once an RF signal has been qualified, a detection signal is generated and subsequently delayed by a second delaying means different than that above. The second delaying means generates a delayed detection signal that is a reproduction of the detection signal shifted in time by a programmable delay of N system clock cycles.

A gating means, responsive to the delayed detection signal, causes an enabling signal to be asserted at the memory means. In response, the memory means causes the delayed digital signals to read into the memory means. Because the enabling signal is only asserted upon the detection of an RF pulse, the memory means selectively removes only the RF data from the continuous stream of digital data generated by the receiver. Furthermore, if the delay N is chosen such that the enabling signal is asserted in less time than delay M, the RF signal data is recorded in the memory means starting at a point relative to the shifted RF signal before it was qualified and even before it first exceeded any threshold requirement. In this manner, the present invention may be used to acquire a complete set of RF data including the entire leading edge, and information therein, of a RF pulse signal. The RE data is made available to the CPU for subsequent processing thereafter.

Figure 1:
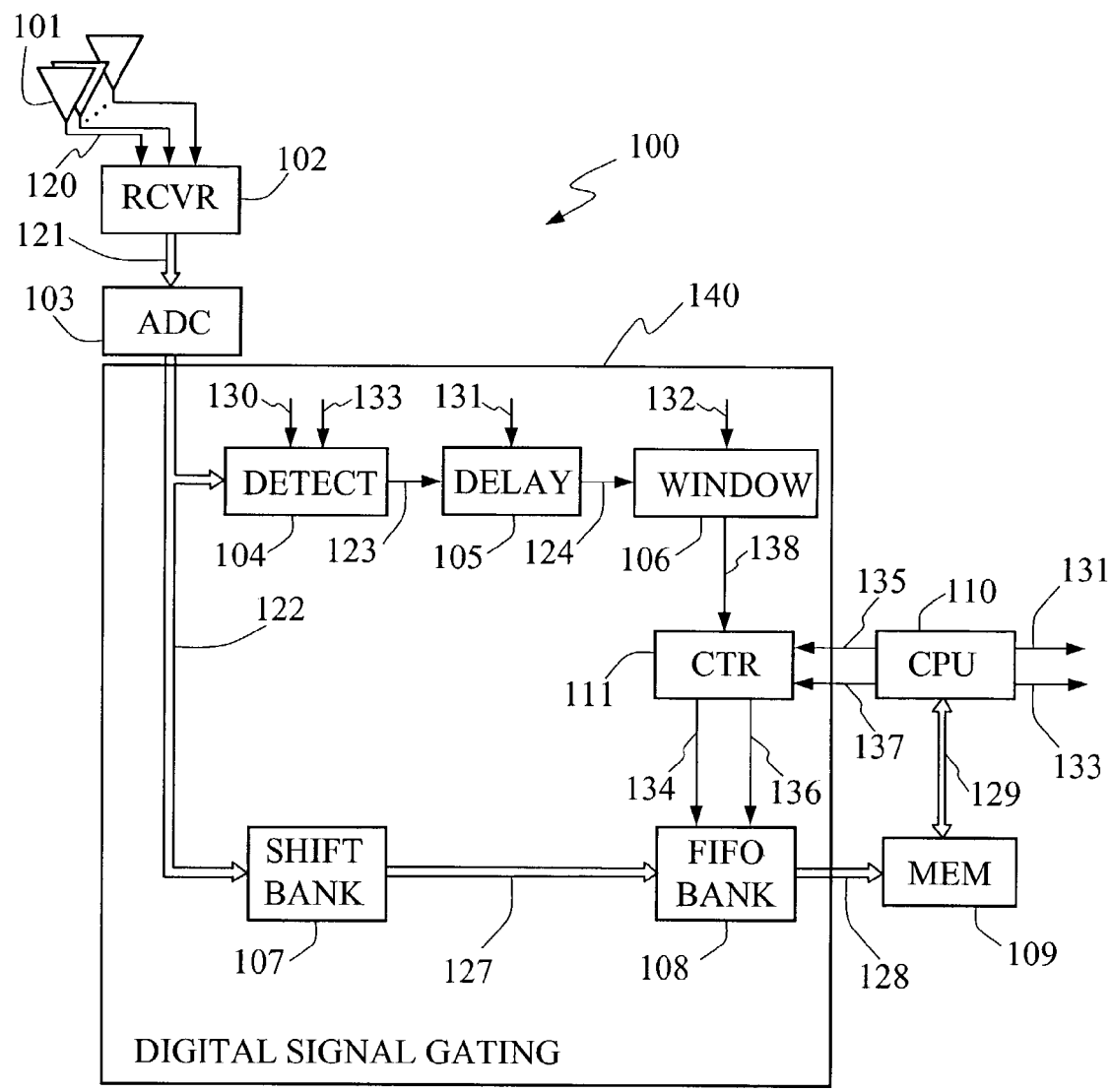
FIG. 1 is a block diagram illustrating the digital signal gating apparatus of a pulse radiation detection system according to the present invention.

Referring to FIG. 1, a digital signal gating apparatus embodiment of the present invention is illustrated in the context of a pulsed radiation detection system 100. The system 100 of this embodiment includes a passive, principally microwave, antenna array 101 capable of detecting electromagnetic radiation over a broad range of frequencies from one or more emitters (not shown) including ground-based and airborne emitters. The received radiation induces signals 120 to emanate from the elements of the antenna array 101 that are conveyed to the multi-channel receiver 102 where they are filtered, amplified and demodulated. The analog signal output of the receiver 121 preferably includes one or more signal amplitudes and phase differences. Although the receiver 102 acquires phase difference measurements, a quadrature detection system would be equally suitable with appropriate modification to the apparatus described herein. The receiver system 101 also includes in an alternative embodiment means for acquiring instantaneous frequency measurements of the received radiation as well as receiver temperature measurements used for calibration purposes. The analog signals 121 from the receiver 102 are converted by the analog-to-digital converter 103, ADC, into digital signals 122 comprising digital measures of the RF signal amplitude for one or more channels, interchannel phase differences, instantaneous signal frequency and receiver temperature. In an alternative embodiment, a digital receiver combines signal reception and digitization in a fashion functionally equivalent to the receiver 102 and ADC 103.

As illustrated in FIG. 1, the digital signal-processing path is bifurcated in order to perform the quantitative signal detection needed to selectively record a minimal amount of signal data in a timely fashion. As a first step, each of the digital signals 122, including the RF signal amplitude, phase differences, frequency and receiver temperature, is conveyed to a first delaying means such as a bank of shift registers 107. The shift registers, as adapted first-in-first-out (FIFO) memory devices, reproduce the digital signals 122 at the shift register output to form delayed digital signals 127 with a predetermined delay of M multiples of the ADC 103 sampling interval. In the preferred embodiment, the digital signals 122 are systematically delayed 64 clock cycles prior to being conveyed to memory means such the bank of FIFO memories 108. The FIFO memories 108, while receiving delayed digital signals 127, only record data when a pulse is detected and the write-enable (wren) signal 134 asserted. That is, the digital measures of the signal amplitude, inter-channel phase differences and receiver temperature are latched and the data held for the main memory 109 only upon the detection of a RF pulse. The FIFO memories 108 are, in a preferred embodiment, 2 kbytes in size and capable of storing numerous received pulses prior to being read out to the central processing unit (CPU) 110.

In parallel with the digital processing described above, the digital signal gating apparatus 140 qualifies received signals in order to record data. The digital signals 122, and specifically the RF signal amplitude in the preferred embodiment, are conveyed to an RF pulse validity detector 104. The pulse validity detector 104 systematically compares the measured signal amplitudes of one or more channels against the programmable threshold T 130. The threshold is defined in consideration of a priori knowledge of the anticipated emitter signals specifically and the electromagnetic environment generally. Typically, the threshold is determined to be as low as practicable when balanced against the need for limiting the number of spurious signals. In most cases, the threshold involves a tradeoff between signal sensitivity and noise rejection. The CPU generates a programmable variable value A 133. Preferably, the pulse validity detector 104 asserts a detection signal 123 when at least one amplitude measurement satisfies a duration requirement, i.e. when at least one amplitude measurement exceeds the threshold 130 for A 133 consecutive sampling points.

The detection signal 123 is then purposefully delayed in the second delaying means 105 by N clock cycles, N being a programmable value 131 provided by the CPU 110. The delayed detection signal 124 is applied to the windowing function 106 where it causes to be generated a continuous gate signal 138, of a programmable duration 132, W, in clock cycles. The gate signal 138 represents a pulse data acquisition window in a delayed reference frame and is aligned with the RF pulse of the delayed digital signals 127. The gate signal 138 is conveyed to counter block 111. The counter block 111 monitors the number of sample points read into the FIFO memories 108. The counter block 111 also re-conveys the gate signal 138 in the form of a second gate signal 134 or terminates the signal when the FIFO memories 108 are filled to capacity. The second gate signal 134 constitutes the write-enable signal 128 of the FIFO memories 108 that, when asserted, causes the digital amplitude, phase difference, frequency and receiver temperature to be recorded for each of the one or more channels of the receiver 102.

Prior to the completion of the radar interrupt interval, or, in limited circumstances, after a completed radar interrupt interval, the central processing unit, CPU, 110 asserts a read signal 135 that causes the counter block 111, itself having a record of the number of sample points stored in FIFO memories 108, to assert a read-enable signal 136 that causes the FIFO memories 108 to output stored RF signal data 128 to the system's main memory 109.

In a preferred embodiment, the pulse radiation detection system 100 may acquire pulse data immediately up to and, in certain circumstances, after the time of a particular radar interrupt signal 137. In the case that a radar interrupt 137 occurs after a valid pulse has been detected and before the acquisition of the pulse data is completed, the interrupt signal may be delayed at counter block 111 until the end of a write cycle when the gating signal 138 is de-asserted. The RF data is subsequently read out 129 to the CPU 110 where it is used for emitter identification and location purposes.

The gate signal 138 allows the FIFO memories 108 to record the delayed digital signals 127 to be recorded at a point in the data stream prior to the threshold crossing that preceded the detection of the incoming pulse. Provided that the propagation time through the first delaying means, M, less the programmable delay N 131 both expressed as clock cycles, is greater than the threshold number of clock cycles A 133 (i.e., M−N>A), the digital signal gating apparatus 140 of the several embodiments of the present invention may be used to acquire the portion of the incoming pulse that exceeds the threshold 130 as well as any number of sampling points preceding the qualification of a valid pulse.

An advantage of the present invention is that the leading edges of valid signal that would otherwise be rejected as being below a threshold setting chosen to substantially reject spurious noise is retained by delaying means and made available for further signal characterizations and processing once the signal to which it is a part is qualified. Thus, more accurate determinations of leading edge TOAs for valid pulses can be made and used in further signal processing.

Figure 2:
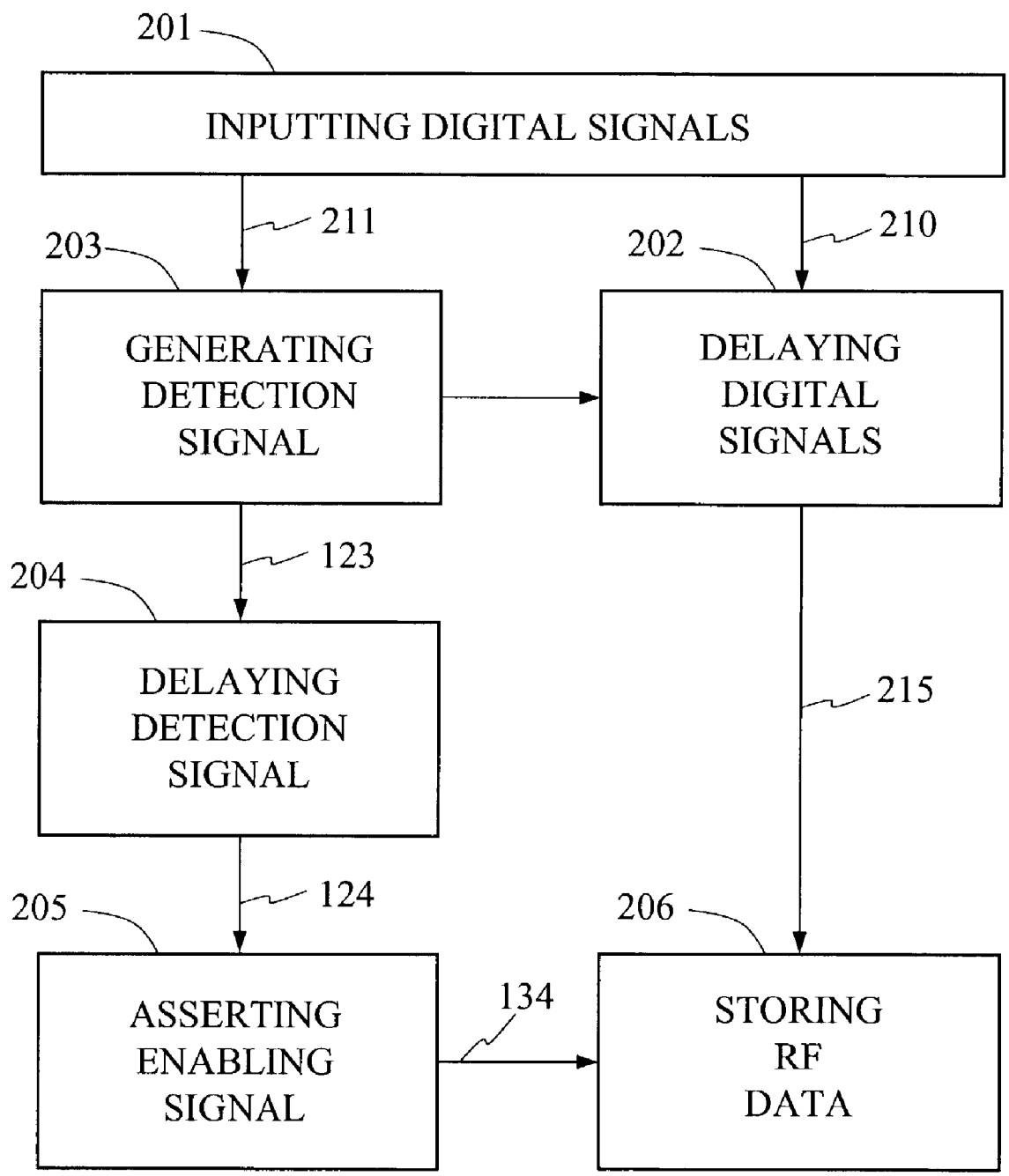
FIG. 2 is a functional block diagram illustrating the process for digitally sampling and storing a received pulse according to the present invention.

FIG. 2 is a functional block diagram illustrating the process for digitally sampling and storing received pulses according to the present invention. The digital signals of measure 122, including the signal amplitudes, phase differences, temperature, and the like, are generated by the digital receiver 102 as part of a continual stream of data provided as input 201 to both the detector 104 and shift block 107. The shift registers 107 cache and delay 202 the data stream 210 including the RF data such that each datum is reproduced at a shift register of the bank of shift registers 107 output a fixed period of time after input.

Concurrent with the first delaying step 202, the digital signals 122 are provided 211 to the detector 104 that in turn generates 203 a detection signal 123 in response to a qualified RF pulse. The detection signal 123 is subsequently delayed 204 a predetermined amount of time. The delayed detection signal 124 in turn causes an enabling signal 134 to be asserted 205 at FIFO memories 108. The enabling signal 134 write-enables the FIFO memories 108, causing the RF data to be selectively removed 215 from the delayed digital signals 127 and stored 206 or otherwise recorded.

Figure 3A:
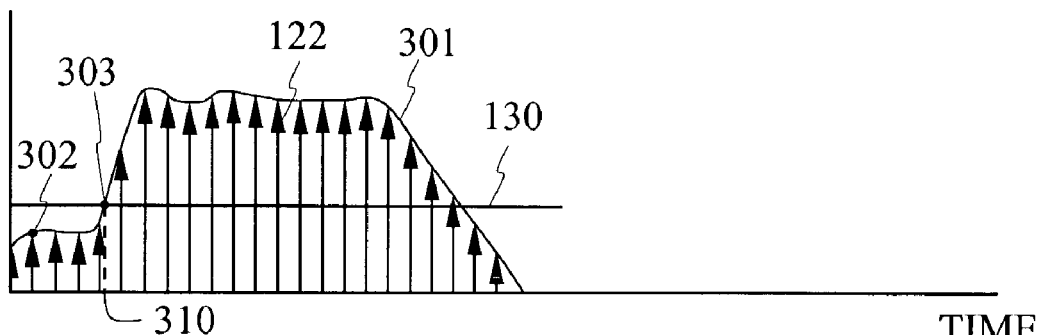
FIGS. 3A, 3B, 3C, and 3D collectively illustrate the digital signal before being delayed, definitional delays and the RF data after sampling by the digital signal gating apparatus of the present invention.
Figure 3B:
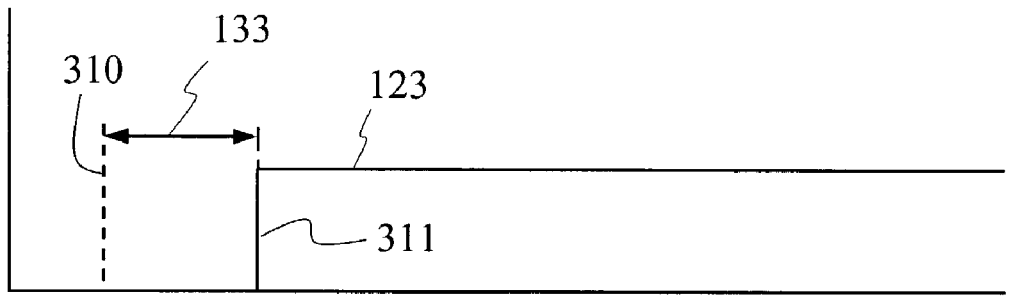
Figure 3C:
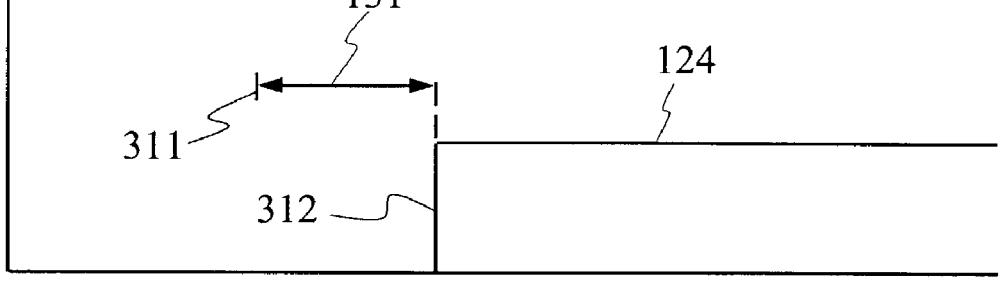
Figure 3D:
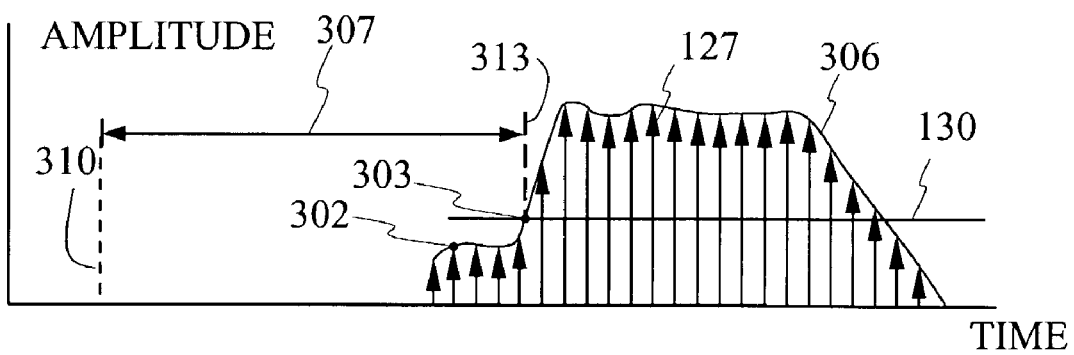

Referring to FIGS. 3A–3D and FIG. 1, the digital signals 122 before being delayed and the RF data after sampling according to the present invention are illustrated. FIG. 3A illustrates a first signal envelope 301 corresponding to a digital signal 122, including sub-threshold portion of the signal envelope at a first point 302 and RF pulse achieving and exceeding the threshold at a second point 303 with a threshold time 310. The first signal envelope 301 represents the continuous equivalent of a pulse now made discrete by an ADC 103 and conveyed to a detector 104. The pulse is qualified by detector 104 when the amplitude exceeds the threshold, T 130 for one or more sampling intervals represented by A 133. FIG. 3B illustrates the detection signal 123 prior to second delaying means 105 and preceded by the interval A 133 where the interval A 133 begins at threshold time 310 and ends at the sum time 311 of the threshold time 310 and the interval A 133. FIG. 3C illustrates the delayed detection signal 124 that begins at a time 312 after the programmable delay 131 of N clock cycles beyond the sum time 311. Neglecting for illustrative purposes the propagation time through the window block 106 and the counter block 111, the leading edge of the enable signal 134 substantially coincides with the assertion of the delayed detection signal 124. FIG. 3D illustrates that in response to the enable signal 134, the FIFO memories 108 begin storing the delayed digital signals 127, collectively represented by a second signal envelope 306, that lag the digital signals 122 by a delay represented by M clock cycles 307. The delayed threshold time 313 is the sum of the M clock cycle delay and the threshold time 310. On the condition that the propagation time through the first delaying means, in system clock cycles, exceeds the sum of the programmable delay in clock cycles and the threshold number of clock cycles (i.e., M>A+N), the entire RF pulse can be captured, including the leading edge of the pulse containing the first point 302 prior to ascending to the threshold 130. Accordingly, by practicing the teachings of the present invention, one can obtain a complete digital record of a qualified RF signal of interest without the undue detriment of false detections that would arise from a system using a low threshold alone.

Figure 4:
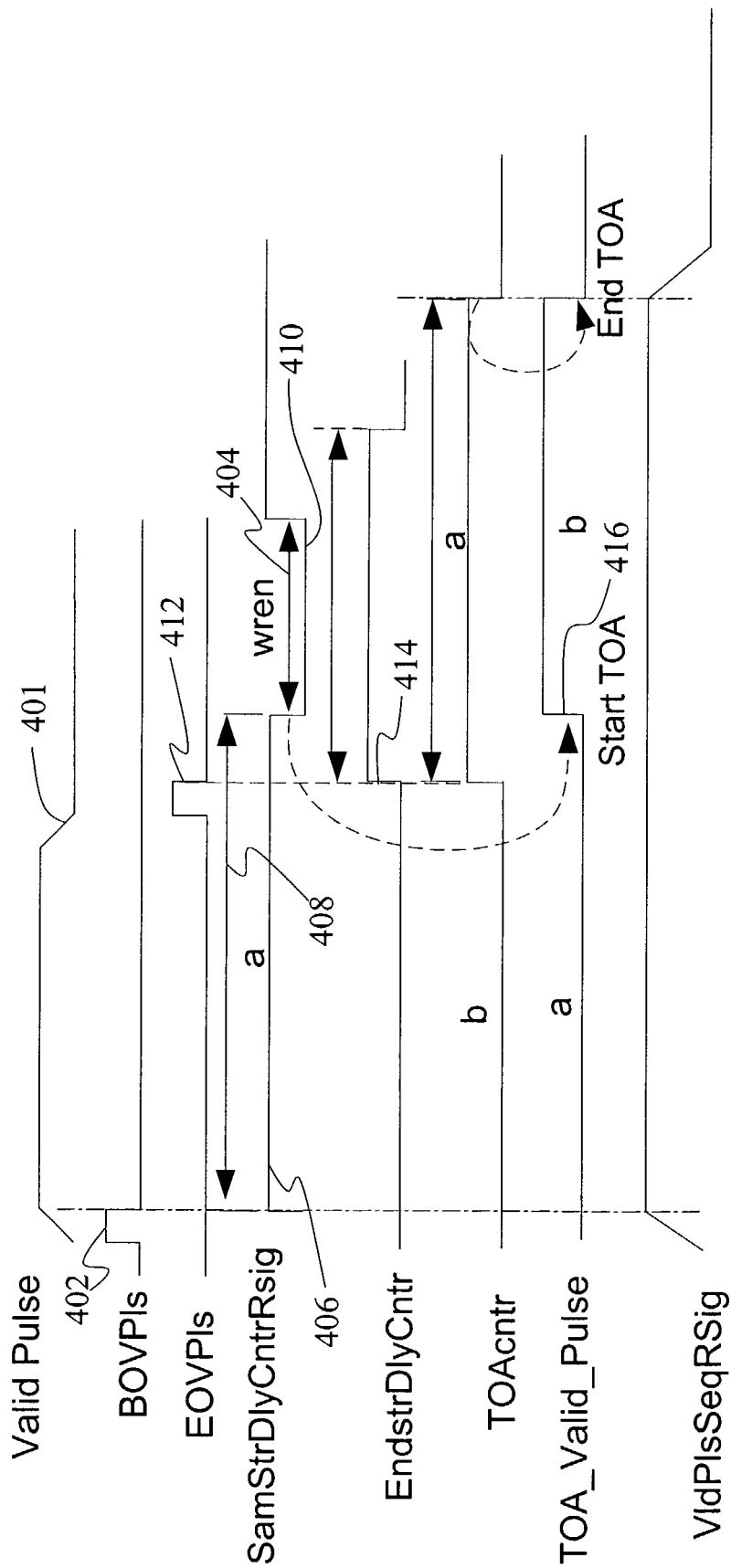
FIG. 4 illustrates a detailed timing diagram of the present invention.

FIG. 4 is a timing diagram illustrating that when an input pulse 401 satisfies the criterion of A 133 consecutive threshold crossings, a beginning-of-valid-pulse signal (BOVPls) 402 is generated, and a counter is started to delay the wren signal 410 to the storage FIFOs 108. This delay plus the wren signal 410 is shown as SamStrDlyCntrRSig 406, where both the delay "a" 408 and the width of the wren signal 404 are programmable. When the detected input pulse satisfies the criteria of m consecutive samples where threshold was not crossed, the end of valid pulse (EOVPls) 412 is generated, starting the counter EndStrDlyCntr 414. The purpose of this counter is to mark the event at end-of-count where the sample that triggers the EOVPls 412 event will be at the output of the delay FIFO and available for storage. Since this is the last sample of interest, wren signal 404 is not allowed to be active beyond this point. This imposes a limit on the delay such that samples taken beyond the end of the pulse may not be stored, preventing the case where the delay has been set for a wide pulse, but a narrow pulse has been detected, and invalid samples are stored. The wren signal 404 initiates the signal TOA_Valid_Pulse 416, the rising edge of which saves the current value of the TOA counter as the start TOA, and the falling edge saves the end TOA. According the disclosed process and apparatus, if wren signal 404 is prevented, the TOA values are not stored.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result.

In addition to the equivalents of the claimed elements, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

We claim:

1. A digital signal gating apparatus of a preprocessor in a detection system; the detection system including a central processing unit, a main memory and a receiver; the apparatus comprising:
   (a) a first digital signal delaying element, responsive to the receiver, wherein the first digital signal delaying element delays an RF signal data from the receiver;
   (b) a signal detection generator, responsive to the receiver;
   (c) a second digital signal delaying element, responsive to the signal detection generator;
   (d) a data acquisition window enable signal generator, responsive to the second digital signal delaying element; and
   (e) a digital data recording element, responsive to the first digital signal delaying element and the data acquisition window enable signal generator, wherein the digital date recording element records the RF signal data delayed by the first digital signal delaying element.

2. A digital signal gating apparatus of a preprocessor in a detection system; the detection system including a central processing unit, a main memory and a receiver; the apparatus comprising:
   (a) first delaying means, responsive to the receiver, for delaying one or more digital signals;
   (b) signal detecting means, responsive to the receiver, for generating a detection signal;
   (c) second delaying means, responsive to the signal detecting means, for delaying the detection signal;
   (d) gating means, responsive to the second delay means, for asserting an enable signal representing a data acquisition window; and
   (e) memory means, responsive to the first and second delaying means, for recording the digital signals in response to the assertion of the enable signal.

3. A digital signal gating apparatus of a preprocessor in a pulsed radiation detection system for acquiring a RF waveform; the radiation detection system including a central processing unit, a main memory and a digital receiver for generating RF signal data; the apparatus comprising:
   (a) first delaying means, responsive to the digital receiver, for delaying the RF signal data a number of clock cycles given by M;
   (b) signal detecting means, responsive to the digital receiver, for generating a detection signal when a RF waveform is detected;
   (c) second delaying means, responsive to the signal detecting means and central processing unit, for delaying the detection signal by a number of clock cycles given by N such that M−N is less than the time for the signal detecting means to assert a detection signal;
   (d) gating means, responsive to the second delay means, for asserting an enable signal representing a data acquisition window; and (e) memory means for causing the RF signal data delayed by the first delaying means to be recorded in response to the assertion of the enable signal wherein M and N are integers.

4. The digital signal gating apparatus of claim 3 wherein the first delaying means includes one or more shift registers.

5. The digital signal gating apparatus of claim 3 wherein the memory means is a first-in-first-out memory device.

6. The digital signal gating apparatus of claim 3 wherein the second delaying means is a counter device for counting off the clock cycles given by M.

7. The digital signal gating apparatus of claim 3 wherein the second delaying means is operatively coupled to the central processing unit from which N is downloaded.

8. The digital signal gating apparatus of claim 3 wherein the apparatus further includes a read counting means, responsive to the gating means, for counting a quantity of data recorded in the memory means.

9. The digital signal gating apparatus of claim 8 wherein the apparatus further includes a write counting means, responsive to the read counting means, for causing the memory means to write to main memory the quantity of data recorded in the memory means.

10. The digital signal gating apparatus of claim 3 wherein the apparatus further includes an interrupt means, responsive to the central processing unit, for postponing a system interrupt signal to avoid loss of RF signal data.

11. The digital signal gating apparatus of claim 3 wherein the signal detecting means, responsive to one or more amplitude measurements, further includes magnitude detection means for comparing the one or more amplitude measurements to a threshold value.

12. The digital signal gating apparatus of claim 3 wherein the signal detection means further includes durational detections means for asserting the detection signal on the condition that the RF signal exceeds the threshold value for two or more clock cycles.

13. A method for gating RF signal data in a pulse radiation detection system including a central processing unit and digital receiver for generating digital signals, the method comprising the steps of:

(a) inputting digital signals from the digital receiver;

(b) generating, with signal detector generator, a detection signal upon detection of RF signal data;

(c) delaying, with a first digital signal delaying element, the detection signal for a period of time given by a first delay input;

(d) generating, with a data acquisition window enable signal generator, a gating signal in response to a detection signal from the first digital signal delaying element;

(e) delaying, with second digital signal delaying element, the digital signals from the digital receiver for a period of time given by a second delay input;

(f) storing, with a data recording element, the RF signal data from the digital signals delayed by the second digital signal delaying element in response to the gating signal; and (g) outputting RF signal data from the data recording element.

* * * * *